(12) United States Patent
Peters (10) Patent No.: US 10,428,672 B2
(45) Date of Patent: Oct. 1, 2019

(54) FLOATING, NON-CONTACT SEAL AND DIMENSIONS THEREOF

(71) Applicant: United Technologies Corporation, Hartford, CT (US)

(72) Inventor: Christopher J. Peters, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 470 days.

(21) Appl. No.: 15/018,374

(22) Filed: Feb. 8, 2016

(65) Prior Publication Data

US 2017/0226883 A1 Aug. 10, 2017

(51) Int. Cl.

| F01D 11/02 | (2006.01) |
| F04D 29/52 | (2006.01) |
| F04D 29/16 | (2006.01) |
| F01D 5/02 | (2006.01) |
| F16J 15/44 | (2006.01) |
| F01D 9/02 | (2006.01) |

(52) U.S. Cl.
CPC ............. *F01D 11/025* (2013.01); *F01D 5/02* (2013.01); *F01D 9/02* (2013.01); *F04D 29/164* (2013.01); *F04D 29/526* (2013.01); *F16J 15/442* (2013.01)

(58) Field of Classification Search
CPC . F01D 11/025; F01D 5/02; F01D 9/02; F04D 29/053; F04D 29/083; F04D 29/321; F16J 15/442; F05D 2220/32; F05D 2240/60
See application file for complete search history.

(56) References Cited

U.S. PATENT DOCUMENTS

| 6,270,309 | B1 | 8/2001 | Ghetzler | |
| 6,428,009 | B2 | 8/2002 | Justak | |
| 7,182,345 | B2 | 2/2007 | Justak | |
| 7,896,352 | B2 | 3/2011 | Justak | |
| 8,002,285 | B2 | 8/2011 | Justak | |
| 8,172,232 | B2 | 5/2012 | Justak | |
| 8,641,045 | B2 | 2/2014 | Justak | |
| 8,777,563 | B2* | 7/2014 | Sarawate | F01D 11/001 415/174.2 |
| 8,919,781 | B2 | 12/2014 | Justak | |
| 2009/0033037 | A1* | 2/2009 | Varanasi | F01D 11/005 277/355 |
| 2013/0170979 | A1* | 7/2013 | Sha | F01D 11/001 415/229 |
| 2013/0195627 | A1 | 8/2013 | Glahn | |
| 2013/0259660 | A1 | 10/2013 | Dale | |
| 2014/0062024 | A1* | 3/2014 | Bidkar | F01D 11/025 277/303 |

\* cited by examiner

*Primary Examiner* — Jason D Shanske
*Assistant Examiner* — Eric J Zamora Alvarez
(74) *Attorney, Agent, or Firm* — O'Shea Getz P.C.

(57) ABSTRACT

Aspects of the disclosure are directed to a seal comprising: a shoe, and at least two beams coupled to the shoe, where a first width associated with the beams exceeds a second width associated with the shoe in a reference direction. Aspects of the disclosure are directed to an engine comprising: a compressor section, a turbine section, and a floating, non-contact seal that includes: a shoe, and at least two beams coupled to the shoe, where the beams extend past an edge of a flowpath surface associated with the shoe in a reference direction.

15 Claims, 7 Drawing Sheets

FLOATING, NON-CONTACT SEAL AND DIMENSIONS THEREOF

STATEMENT REGARDING FEDERALLY SPONSORED RESEARCH OR DEVELOPMENT

This invention was made with government support under contract number FA8650-09-D-2923-AETD awarded by the United States Air Force. The government has certain rights in the invention.

BACKGROUND

Seals are used in aircraft engines to isolate a fluid from one or more areas/regions of the engine. For example, seals are used to control various characteristics (e.g., temperature, pressure) within the areas/regions of the engine and can be useful to ensure proper/efficient engine operation and stability.

High pressure applications of floating, non-contact seals require beams with more torsional stiffness to resist shoe twisting with pressure loads. Typically, shoe aerodynamic design parameters do not enable the shoe to be sized beyond a given dimension due to (radial) force balance requirements/constraints. Still further, constraints associated with the natural frequency of the shoe may limit the shoe size or require stiffer beams without increasing stress.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a seal comprising: a shoe, and at least two beams coupled to the shoe, where a first width associated with the beams exceeds a second width associated with the shoe in a reference direction. In some embodiments, the seal is configured as a segment, and the segment is configured to be coupled to a plurality of segments to form a ring. In some embodiments, the ring is bounded by a support ring. In some embodiments, the first width exceeds a furthest edge or face of the support ring in the reference direction. In some embodiments, the shoe includes at least one protrusion that is configured to maintain a clearance between the seal and a component within a threshold amount.

Aspects of the disclosure are directed to an engine comprising: a compressor section, a turbine section, and a floating, non-contact seal that includes: a shoe, and at least two beams coupled to the shoe, where the beams extend past an edge of a flowpath surface associated with the shoe in a reference direction. In some embodiments, the seal is incorporated in one of the compressor section or the turbine section. In some embodiments, the reference direction is an axial direction associated with the engine. In some embodiments, the reference direction is oriented aft. In some embodiments, the seal includes a support ring. In some embodiments, the support ring is coupled to a stator of the engine, and the shoe interfaces to a rotating structure of the engine. In some embodiments, the rotating structure includes at least one of a shaft or a rotor. In some embodiments, the beams extend past an aft-most edge or face of the support ring in the reference direction. In some embodiments, the support ring extends past the edge of the flowpath surface in the reference direction. In some embodiments, at least a portion of the shoe extends past the edge of the flowpath surface in the reference direction. In some embodiments, the shoe includes at least one protrusion that is configured to maintain a clearance between the seal and a rotating component within a threshold amount. In some embodiments, an amount by which the beams extend past the edge of the flowpath surface in the reference direction provides the seal with a natural frequency that is greater than a range of operating frequencies associated with the engine. In some embodiments, an amount by which the beams extend past the edge of the flowpath surface in the reference direction avoids interfering with a fluid that traverses the flowpath surface.

BRIEF DESCRIPTION OF THE DRAWINGS

The present disclosure is illustrated by way of example and not limited in the accompanying figures in which like reference numerals indicate similar elements. The drawing figures are not necessarily drawn to scale.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

In accordance with various aspects of the disclosure, apparatuses, systems, and methods are described for separating (a dimension of two or more) beams of a seal from a counterpart/corresponding (dimension of a) shoe of the seal. In some embodiments, a beam may be extended in a given reference direction relative to the shoe (or a flowpath associated therewith) such that the dimension of the beam can be changed without appreciably impacting the aerodynamic design of the shoe. In some embodiments, the seal may include at least some characteristics that are common with a HALO® seal provided by, e.g., Advanced Technologies Group, Inc. of Stuart, Fla. Such characteristics may include the provisioning of one or more floating, non-contact seals.

Figure 1:
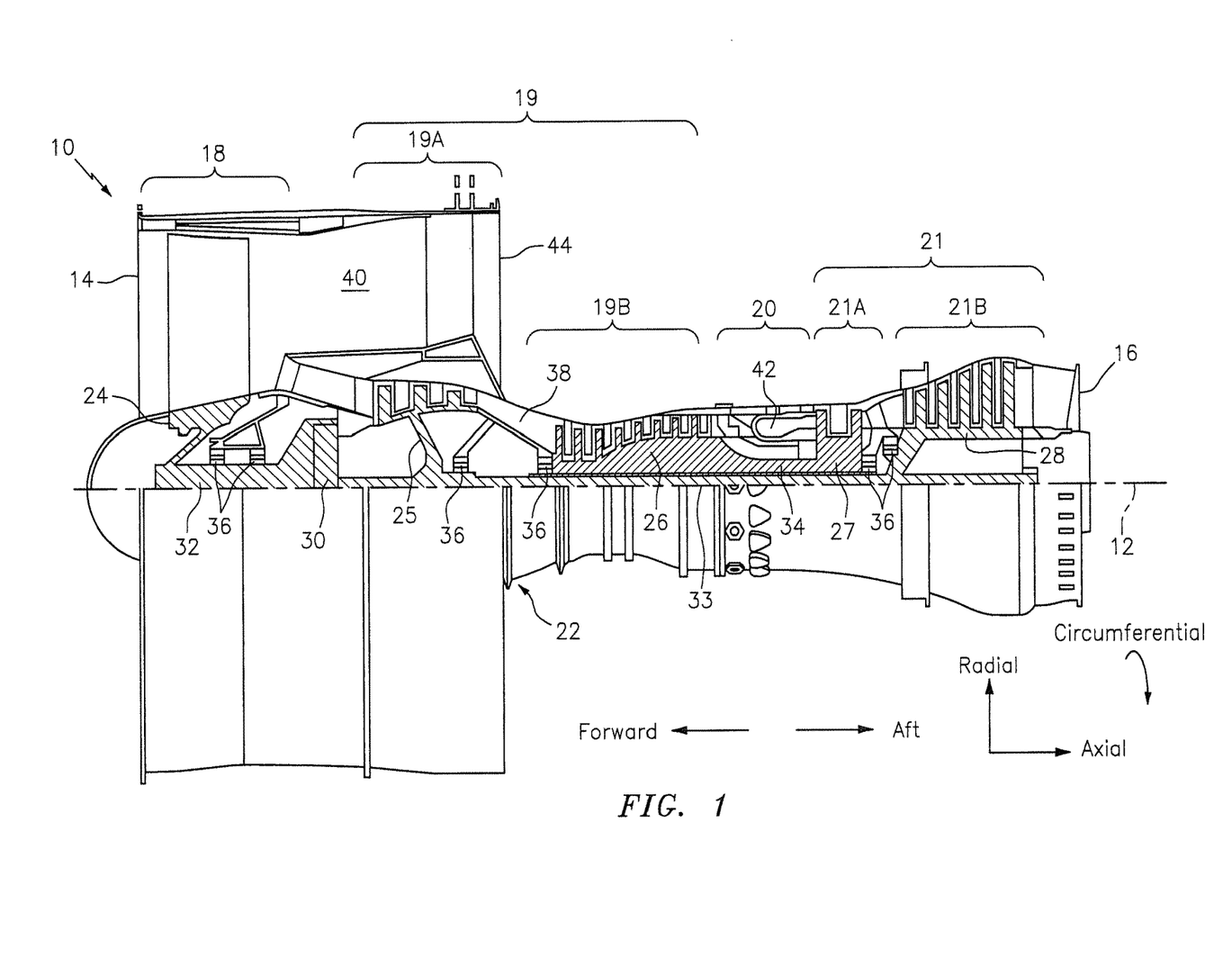
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. As one of skill in the art would appreciate, the engine 10 or its associated sections may include rotating hardware and stationary/fixed hardware.

Figure 2A:
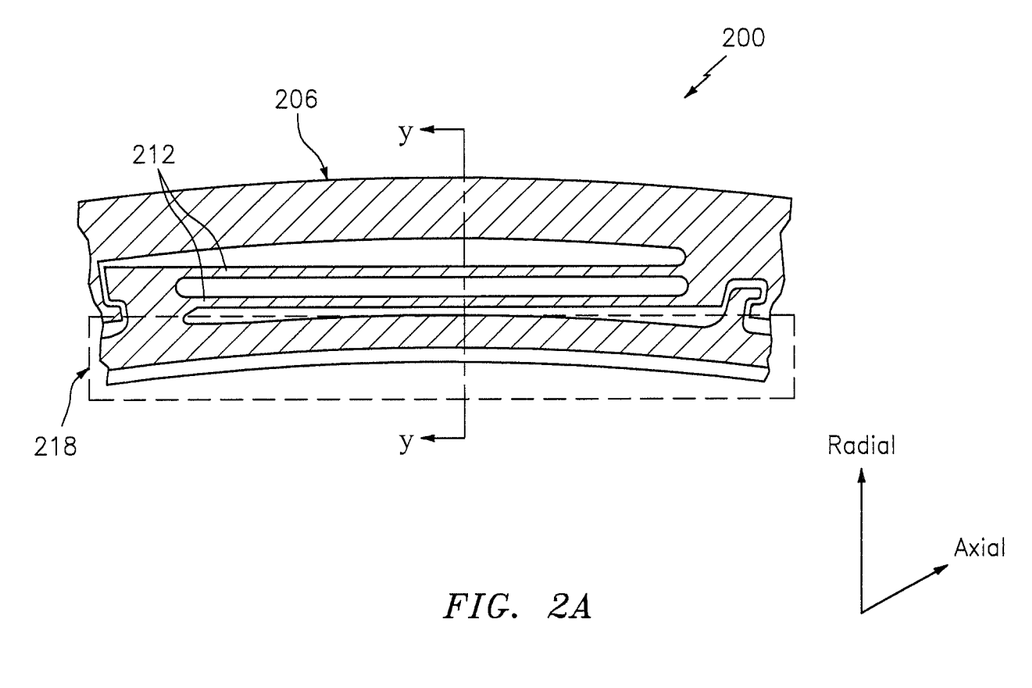
FIGS. 2A-2B illustrate components of a seal in accordance with aspects of the disclosure.

Referring now to FIG. 2A a seal 200 is shown. The seal 200 may be incorporated as part of one or more sections of an engine, such as for example the compressor section 19 or the turbine section 21 of the engine 10 of FIG. 1.

Figure 3:
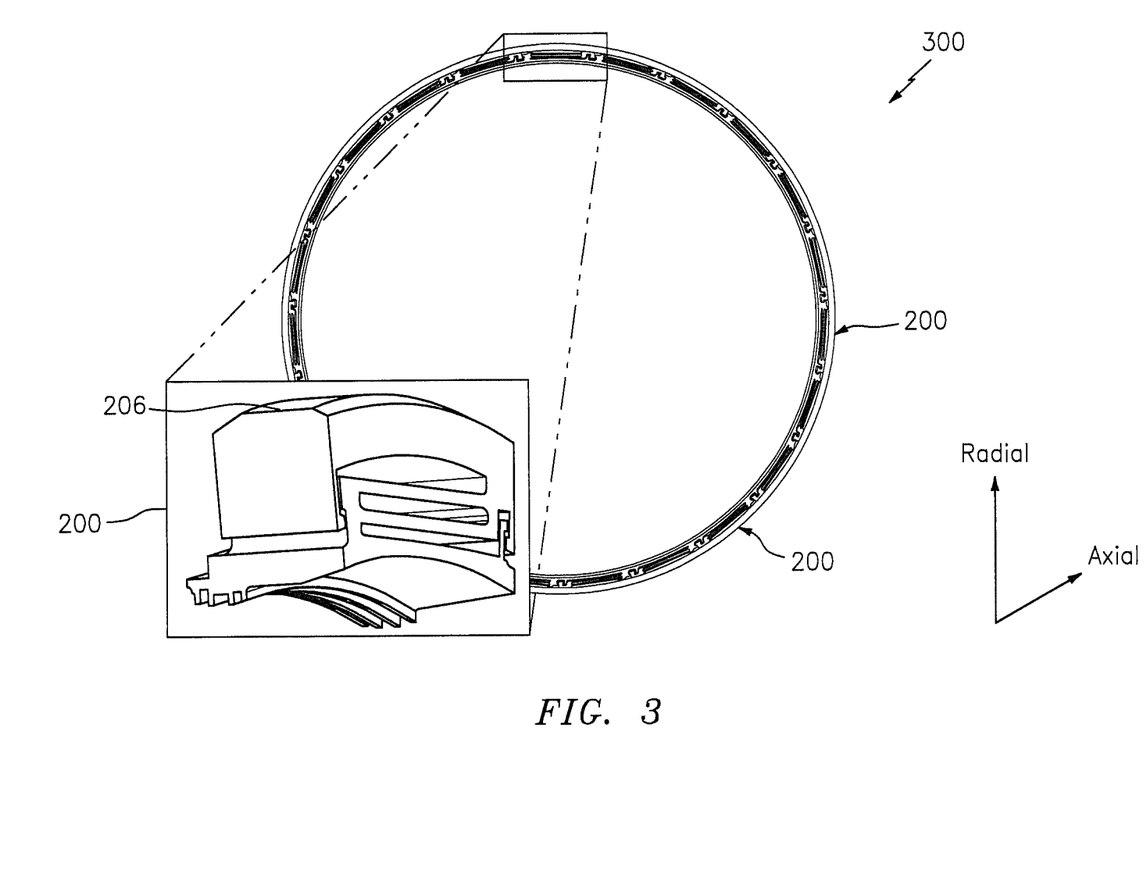
FIG. 3 illustrates an arrangement of seal segments in accordance with aspects of this disclosure.

The seal 200 may include a support ring 206, two or more beams 212, and a shoe 218. As can be seen in FIG. 3, the seal 200 extends lengthwise circumferentially; i.e., support ring 206, two or more beams 212, and a shoe 218 extend lengthwise circumferentially. The support ring 206 has an aft face surface 272 and a forward face surface 273. In connection with interfacing/sealing rotating hardware (e.g., a rotor, a shaft, etc.) relative to fixed hardware/structure (e.g., a stator), the shoe 218 may be located in a non-contact position along an exterior surface of the rotating hardware. The support ring 206 may be coupled to the fixed hardware and/or may form a part of fixed structure as part of a ring (see FIG. 3). The beams 212 may be radially located between the support ring 206 and the shoe 218.

The beams 212 may be flexible in, e.g., the radial direction, but may be stiff in one or more other directions so that the beams 212 can assist in preventing a roll-over or movement of the shoe 218 with respect to the rotating or fixed hardware, thus maintaining an effective seal under pressure load. The mechanical operation of the seal 200 may be analogized to that of a mass attached to a spring, where the natural frequency of the seal ($f_n$) may be proportional to the square root of the ratio of the stiffness of the beams 212 to the mass of the shoe 218. E.g.:

$f_n$~square root (stiffness/mass)

The natural frequency of the seal ($f_n$) may be selected to be greater than the frequencies over which the engine may operate in order to ensure that the seal 200 operates in a stable manner over the engine operating range. Thus, to increase the natural frequency of the seal ($f_n$) the stiffness may be increased or the mass may be decreased. Assuming a given mass, an increase in the natural frequency ($f_n$) implies an increase in the stiffness.

Figure 2B:
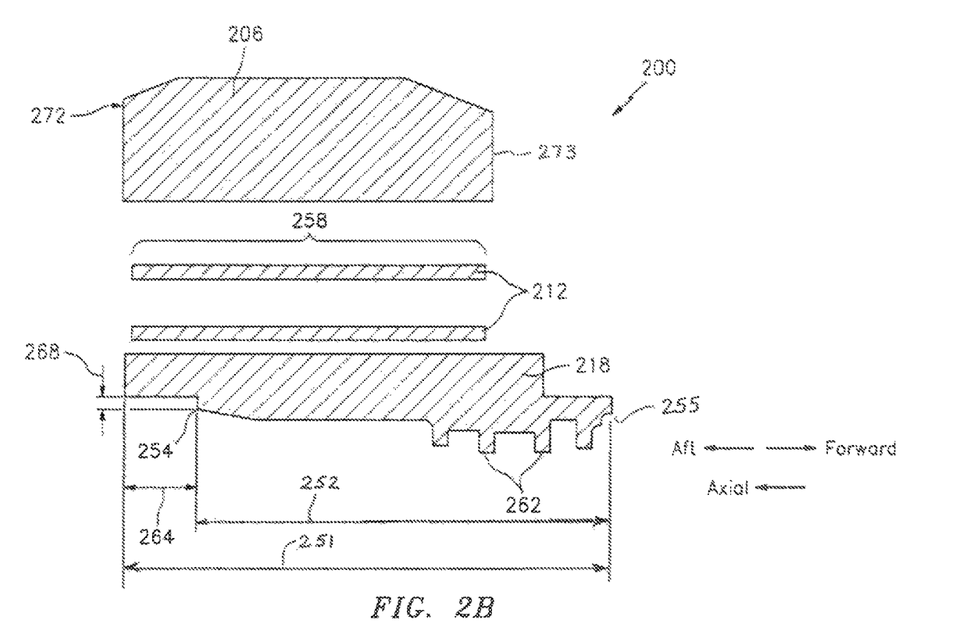

FIG. 2B illustrates a cross-sectional view of the seal 200 of FIG. 2A about the line y-y. The shoe 218 includes an axially extending width 251 and the beams 212 have an axially extending width 258. A flowpath surface portion of the axial width 251 of the shoe 218 is denoted via reference character 252. The flow path surface portion 252 extends between an aft axial end 254 and a forward axial end 255. As shown in FIG. 2B, a portion of the axially extending width 258 of the beams 212 may exceed or extend beyond (i.e., disposed axially outside of) an axial edge/end 254 of the flowpath surface 252 (illustratively in an axial, aft reference direction), in an amount denoted by reference character 264 and may exceed or extend a radial offset amount denoted by reference character 268 from the axial edge/end 254 of the flow path surface 252, without appreciably impacting the interaction of the flowpath surface 252 relative to other hardware or the interaction of the seal with respect to one or more fluids.

The axially extending widthwise portion 264 of the beams 212 may increase the stiffness of the seal 200 (relative to a scenario where the dimension 258 of the beams 212 would have otherwise terminated coincident with the aft-most portion of the flowpath surface 252—see for example FIGS. 11 and 12 of U.S. Pat. No. 8,919,781 (beams are equal to or less than the width); the contents of U.S. Pat. No. 8,919,781 are incorporated herein by reference) thereby increasing the natural frequency of the seal ($f_n$). Such an increase in the natural frequency of the seal ($f_n$) may be obtained without imposing additional bending stresses on the seal 200 for a given amount of radial travel/displacement. In some embodiments, the axially extending widthwise portion 264 of the beams 212 may even exceed, in the aft axial direction, an aft-most edge/face 272 of the support ring 206. In some embodiments, the axially extending widthwise portion 264 of the beams 212 might be selected/configured to avoid interfering with a fluid that traverses the flowpath surface 252.

The shoe 218/flowpath surface 252 may include one or more protrusions (or analogously, indentations) 262 formed therein. The protrusions 262 may be configured or used to set and maintain a clearance, within a threshold amount, between the shoe 218/seal 200 and another component (e.g., a rotating component or structure) that interfaces to the shoe 218/seal 200. Various parameters (e.g., count, shape, size, etc.) of the protrusions 262 may be determined using computational fluid dynamic (CFD) analyses as would be appreciated by one of skill in the art.

The seal 200 may correspond to a segment of a larger seal configuration. For example, and referring to FIG. 3, a seal 300 is shown as being formed as a ring from multiple instances of the seal 200 being coupled to one another. The support ring 206 may be a full-hoop structure that provides support, or bounds, the seal segments 200.

Figure 4A:
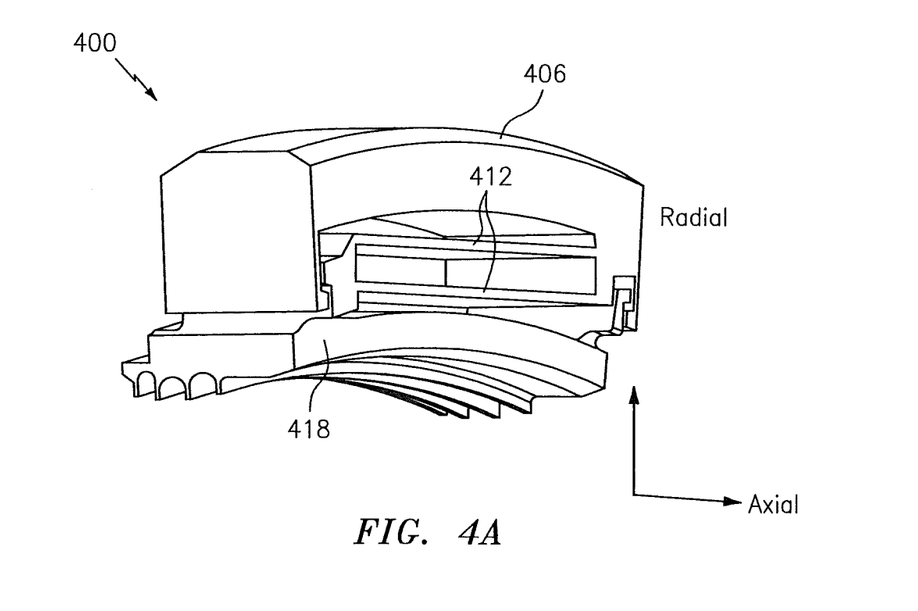
FIGS. 4A-4B illustrate components of a seal in accordance with aspects of the disclosure.
Figure 4B:
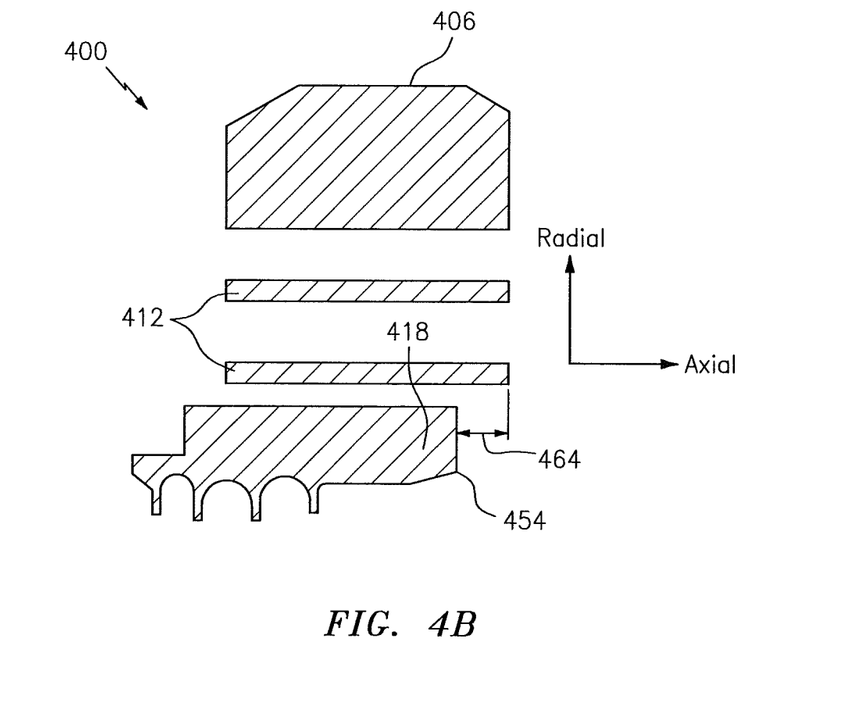

FIGS. 4A-4B illustrate a seal 400. Similar to the seal 200, the seal 400 may include a support ring 406, two or more beams 412, and a shoe 418. As shown in FIGS. 4A-4B, the support ring 406 and the beams 412 may be extended in an amount denoted by reference character 464 in a reference direction (illustratively, an axial reference direction) relative to an endpoint 454 of a flowpath surface, whereas the shoe 418 might not be extended in the reference direction.

Comparing FIG. 2B to FIG. 4B, a beam offset can extend down into the shoe cross section like it does in FIG. 2B or the offset can end at the beam mounts as shown in FIG. 4B.

Figure 5A:
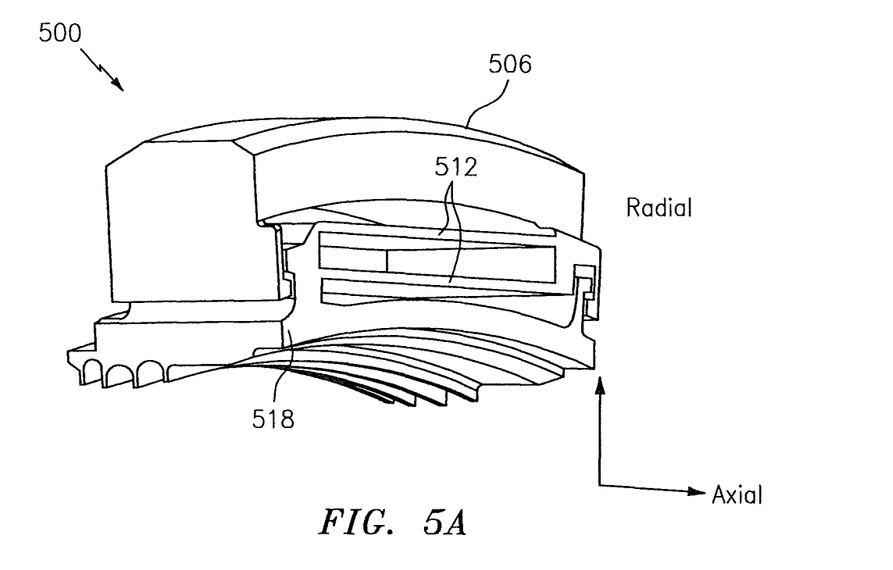
FIGS. 5A-5B illustrate components of a seal in accordance with aspects of the disclosure.
Figure 5B:
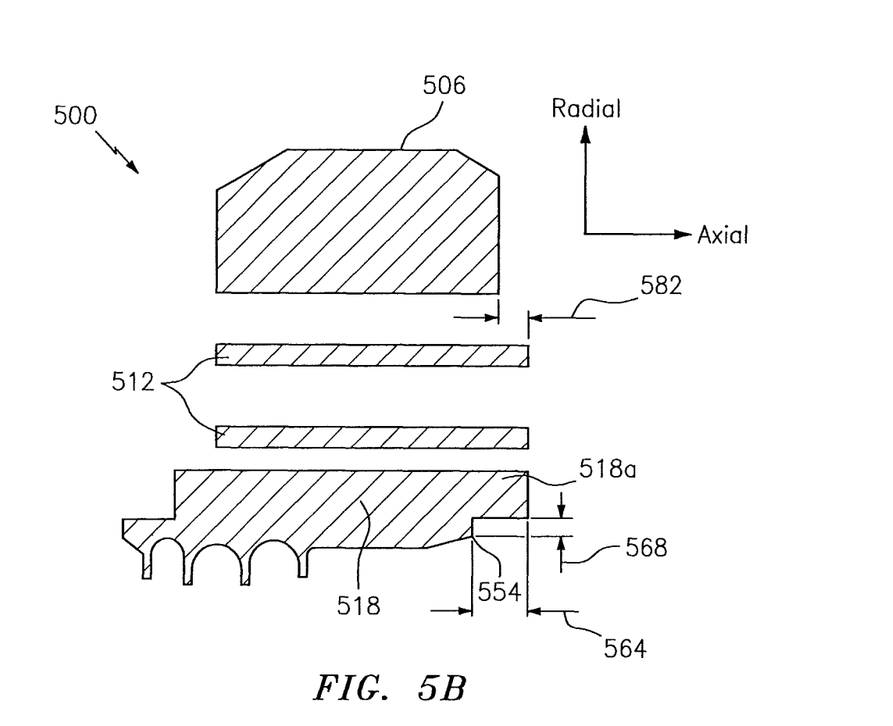

FIGS. 5A-5B illustrate a seal 500. Similar to the seals 200 and 400, the seal 500 may include a support ring 506, two or more beams 512, and a shoe 518. As shown in FIGS. 5A-5B, the beams 512 and (at least a top-most portion 518$a$ of) the shoe 518 may be extended in an amount denoted by reference character 564 in a reference direction (illustratively, an axial reference direction) relative to an endpoint 554 of a flowpath surface, whereas the support ring 506 might not be extended in the reference direction. The seal 500 (e.g., the shoe 518) may be associated with a radial offset 568, where the offset 568 provides a similar purpose/function as the offset 268 described above. In some embodiments, the support ring 506 may be offset by an amount denoted by reference character 582 in the reference direction. The offset 582 demonstrates that the beam width can be disassociated from the support ring 506 in addition to a length of the shoe 518; such features may be useful for packaging purposes or reducing weight.

Figure 6A:
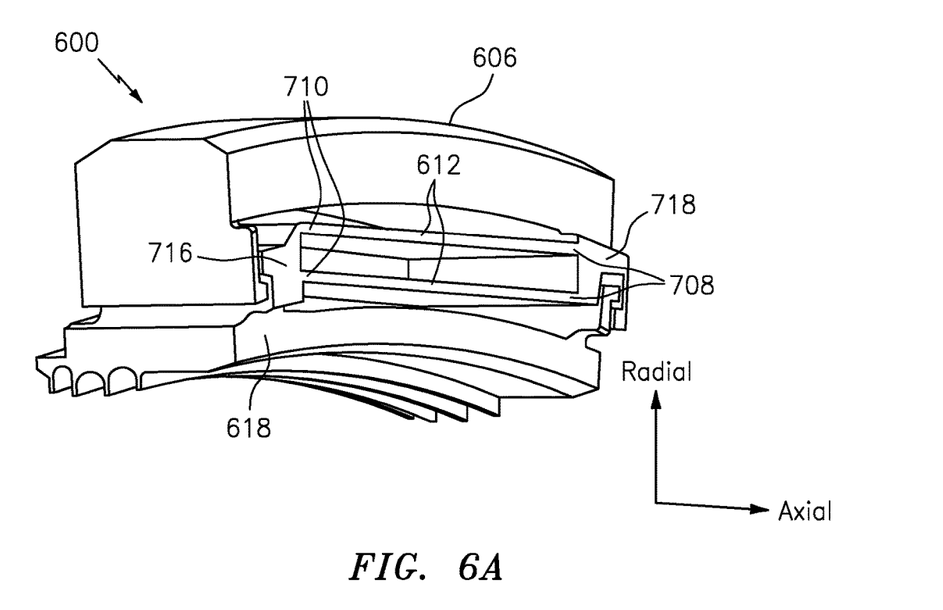
FIGS. 6A-6B illustrate components of a seal in accordance with aspects of the disclosure.
Figure 6B:
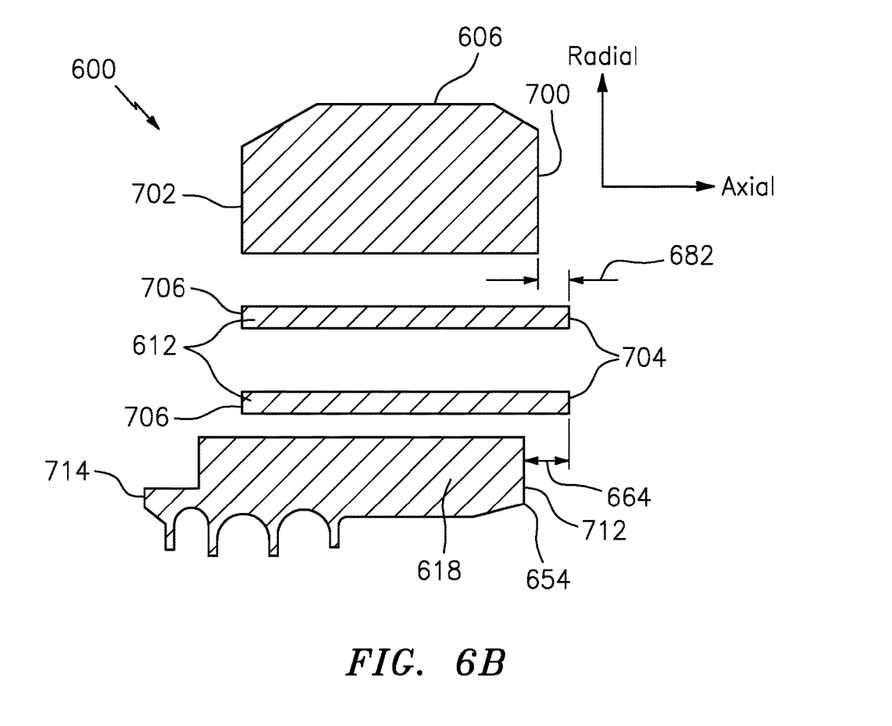

FIGS. 6A-6B illustrate a seal 600. Similar to the seals 200, 400, and 500, the seal 600 may include a support ring 606, two or more beams 612, and a shoe 618. The support ring 606 may be described as having a first axial support ring end 700 and a second axial support ring end 702. Each beam 612 may be described as having a first axial beam end 704, a second axial beam end 706, a first circumferential end 708, and a second circumferential end 710. The shoe 618 may be described as having a first axial shoe end 712 and a second axial shoe end 714. The second circumferential end 710 of each beam 612 is connected to a member 716 that is connected to the shoe 618. The first circumferential end 708 of each beam is connected to a member 718 that is connected to the support ring 606. As shown in FIGS. 6A-6B, the beams 612 may be extended in an amount denoted by reference character 664 in a reference direction (illustratively, an axial reference direction) relative to an endpoint 654 of a flowpath surface, whereas the support ring 606 and the shoe 618 might not be extended in the reference direction. The seal 600 embodiment shown in FIGS. 6A-6B, for example, illustrates the first axial beam ends 704 of the beams 612 axially displaced from the endpoint 654 of the flowpath surface (which endpoint 654 coincides with the first axial shoe end 712); e.g., as illustrated by extension distance 664. In some embodiments, the support ring 606 may be offset by an amount denoted by reference character 682 in the reference direction, where the offset 682 provides a similar purpose/function as the offset 582 described above. The seal 600 embodiment shown in FIGS. 6A-6B, for example, illustrates the first axial beam ends 704 of the beams 612 axially displaced from the first axial support ring end 700 of the support ring 606; e.g., as illustrated by extension distance 682.

Technical effects and benefits of this disclosure include a widening of one or more beams of a seal relative to conventional seals. For example, in some embodiments a beam may exceed a span/width of a flowpath surface associated with a shoe of the seal. Such a configuration may allow a seal designer to de-couple the sizing/dimension of the shoe from the sizing/dimension of the beam(s). A widening/thickening of the beams can enhance stiffness without increasing bending stresses. Furthermore, increasing the beam dimension relative to the shoe dimension provides for enhanced torsional control of the seal operation.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A seal comprising:
   a support ring having a first axial support ring end and a second axial support ring end;
   a shoe having a circumferentially extending length and an axially extending width, the axially extending width extending between a first axial shoe end and a second axial shoe end; and
   at least two beams, each having an axially extending width that extends between a first axial beam end and a second axial beam end, each beam having a first circumferential end and a second circumferential end;
   wherein the second circumferential end of each beam is connected to a first member that is connected to the shoe, and the first circumferential end of each beam is connected to a second member that is connected to the support ring and wherein the first and second axial beam ends of each beam extend from the first member to the second member;
   wherein the first axial beam end of each beam is disposed axially outside of the first axial shoe end of the shoe and the second axial beam end of each beam is disposed axially inside of the first axial shoe end of the shoe; and
   wherein the first axial beam end of each beam extends axially beyond the first axial support ring end with respect to the second axial support ring end.

2. The seal of claim 1, wherein the seal is configured as a segment, and wherein the segment is configured to be coupled to a plurality of segments to form a ring.

3. The seal of claim 2, wherein the first axial beam end of each said beam is an aft end of said beam, and the second axial beam end of each said beam is a forward end of said beam.

4. The seal of claim 1, wherein the shoe includes an axially extending flow path surface that extends from the first axial shoe end towards the second axial shoe end and wherein the shoe includes at least one protrusion extending radially inward from the axially extending flow path surface.

5. The seal of claim 1, wherein the support ring is radially outside and spaced from the shoe and wherein the at least two beams are disposed radially between the support ring and the shoe.

6. The seal of claim 1, wherein the at least two beams extend tangentially from the first member to the second member.

7. The seal of claim 1, wherein a first beam of the at least two beams is disposed radially outside and spaced from a second beam of the at least two beams.

8. An engine comprising:
a compressor section;
a turbine section; and
a floating, non-contact seal that includes:
  a support ring having a first axial support ring end and a second axial support ring end;
  a shoe having a circumferentially extending length and an axially extending width, the axially extending width extending between a first axial shoe end and a second axial shoe end; and
  at least two beams, each having an axially extending width that extends between a first axial beam end and a second axial beam end, each beam having a first circumferential end and a second circumferential end;
wherein the second circumferential end of each beam is connected to a first member that is connected to the shoe, and the first circumferential end of each beam is connected to a second member that is connected to the support ring and wherein the first and second axial beam ends of each beam extend from the first member to the second member;
wherein the first axial beam end of each beam is disposed axially outside of the first axial shoe end of the shoe and the second axial beam end of each beam is disposed axially inside of the first axial shoe end of the shoe; and
wherein the first axial beam end of each beam extends axially beyond the first axial support ring end with respect to the second axial support ring end.

9. The engine of claim 8, wherein the seal is incorporated in one of the compressor section or the turbine section.

10. The engine of claim 8, wherein the first axial beam end of each said beam is an aft end of said beam, and the second axial beam end of each said beam is a forward end of said beam.

11. The engine of claim 8, wherein the support ring is coupled to a stator of the engine, and wherein the shoe interfaces to a rotating structure of the engine.

12. The engine of claim 11, wherein the rotating structure includes at least one of a shaft or a rotor.

13. The engine of claim 8, wherein first axial support ring end extends axially beyond the first axial shoe end of the shoe with respect to the second axial shoe end of the shoe.

14. The engine of claim 8, wherein the shoe includes an axially extending flow path surface that extends from the first axial shoe end towards the second axial shoe end and wherein the shoe includes at least one protrusion extending radially inward from the axially extending flow path surface.

15. The engine of claim 8, wherein the first axial beam end of each beam extends axially beyond the first axial shoe end of the shoe with respect to the second axial shoe end of the shoe by an amount that provides the seal with a natural frequency that is greater than a range of operating frequencies associated with the engine.

* * * * *

UNITED STATES PATENT AND TRADEMARK OFFICE
CERTIFICATE OF CORRECTION

PATENT NO. : 10,428,672 B2
APPLICATION NO. : 15/018374
DATED : October 1, 2019
INVENTOR(S) : Christopher J. Peters Page 1 of 1

It is certified that error appears in the above-identified patent and that said Letters Patent is hereby corrected as shown below:

In the Specification

Column 1, Line 8, please delete "FA-8650-09-D-2923-AETD" and insert --FA-8650-09-D-2923-0021--

Signed and Sealed this
Nineteenth Day of November, 2019

Andrei Iancu
*Director of the United States Patent and Trademark Office*